United States Patent [19]

Bunnelle

[11] Patent Number: 4,510,971
[45] Date of Patent: Apr. 16, 1985

[54] CIRCUITRY FOR OPERATING AN EXTENDIBLE BOOM AND A SERVICE LINE

[75] Inventor: Philip R. Bunnelle, Santa Clara, Calif.

[73] Assignee: FMC Corporation, Chicago, Ill.

[21] Appl. No.: 516,232

[22] Filed: Jul. 22, 1983

[51] Int. Cl.³ .................... F16L 3/00; F15B 15/26
[52] U.S. Cl. ........................................ 137/615; 91/44; 91/45; 141/387; 414/718
[58] Field of Search ............... 91/44, 45, 517; 60/426, 60/427; 137/615; 141/231, 232, 279, 387, 388

[56] References Cited

U.S. PATENT DOCUMENTS

| 2,715,912 | 8/1955 | Cameron et al. | 137/615 |
| 3,032,082 | 5/1962 | Vilain | 141/388 |
| 3,087,636 | 4/1963 | Weaver | 414/718 |
| 3,654,833 | 4/1972 | Griffiths | 91/45 |
| 3,668,973 | 6/1972 | Kado et al. | 91/45 |
| 3,851,766 | 12/1974 | Gill et al. | 60/426 |
| 3,895,779 | 7/1975 | Cassez et al. | 91/44 |
| 4,269,239 | 5/1981 | Haley | 137/615 |
| 4,391,297 | 7/1983 | Knight | 141/387 |
| 4,468,166 | 8/1984 | Jameson | |

Primary Examiner—A. Michael Chambers
Attorney, Agent, or Firm—Lloyd B. Guernsey; H. M. Stanley; R. B. Megley

[57] ABSTRACT

A hydraulic circuit for selectively extending and retracting a mobile telescoping boom assembly and for independently extending and retracting an articulated pipe service line mounted on the boom assembly. The circuit can be used with a hydraulic ram to extend and retract the boom assembly or a winch and cable arrangement can be used. A pair of winches are used to extend and retract the articulated service line.

13 Claims, 7 Drawing Figures

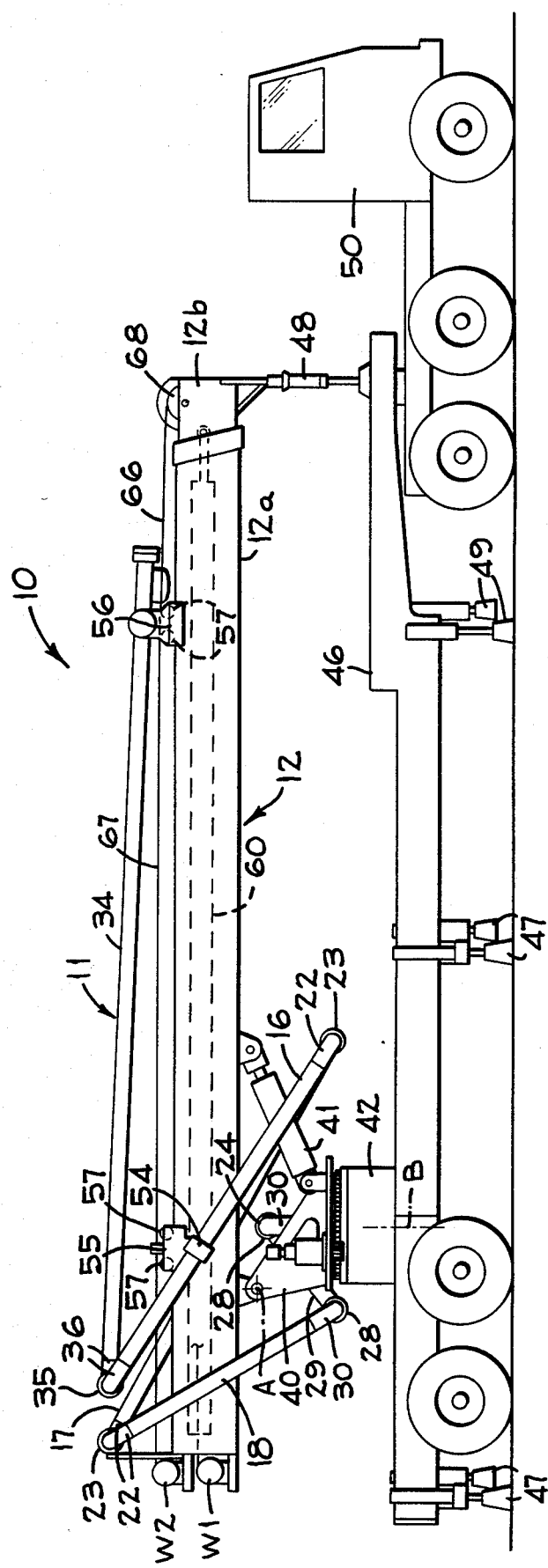
FIG_1

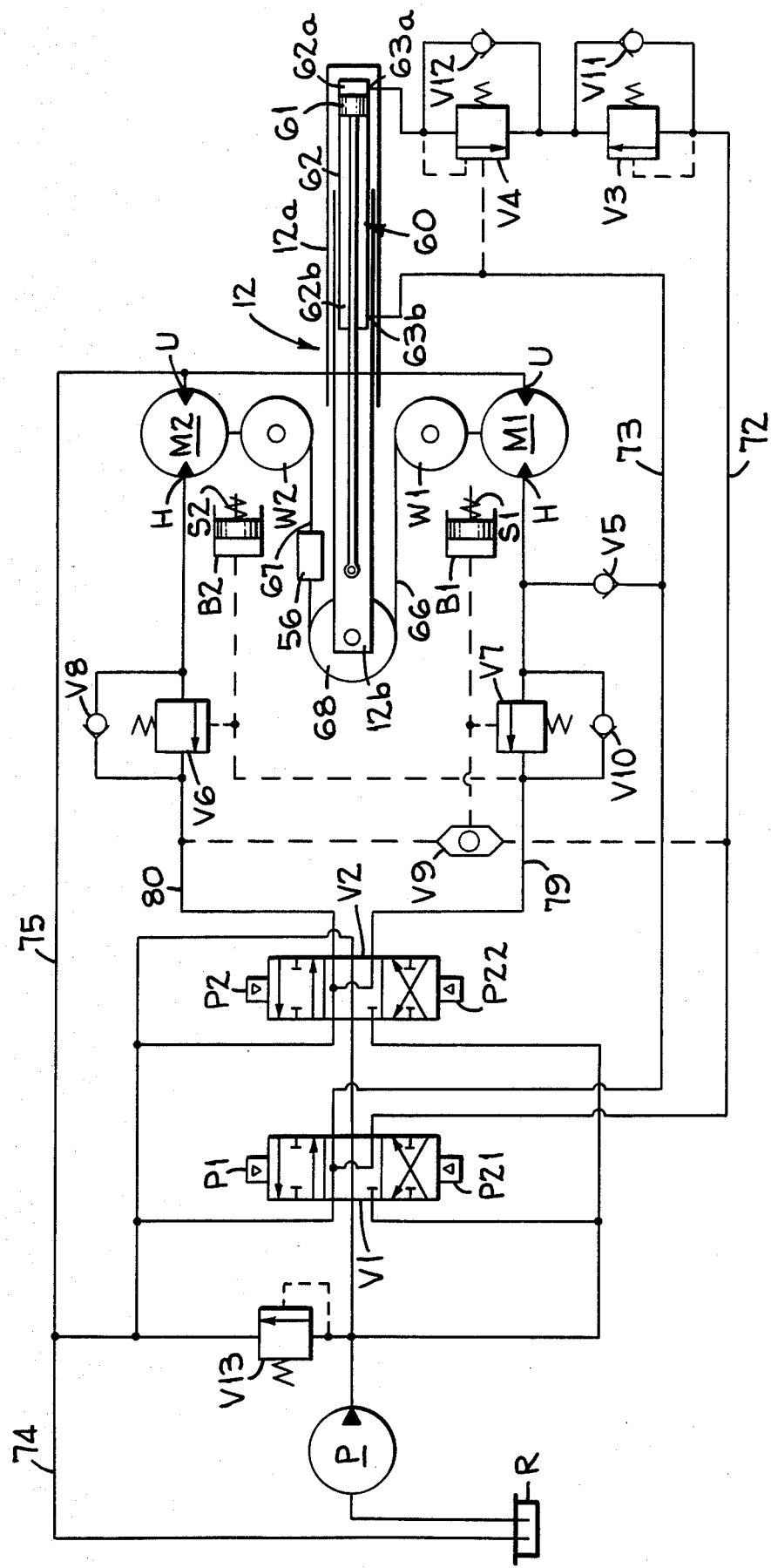
FIG_2

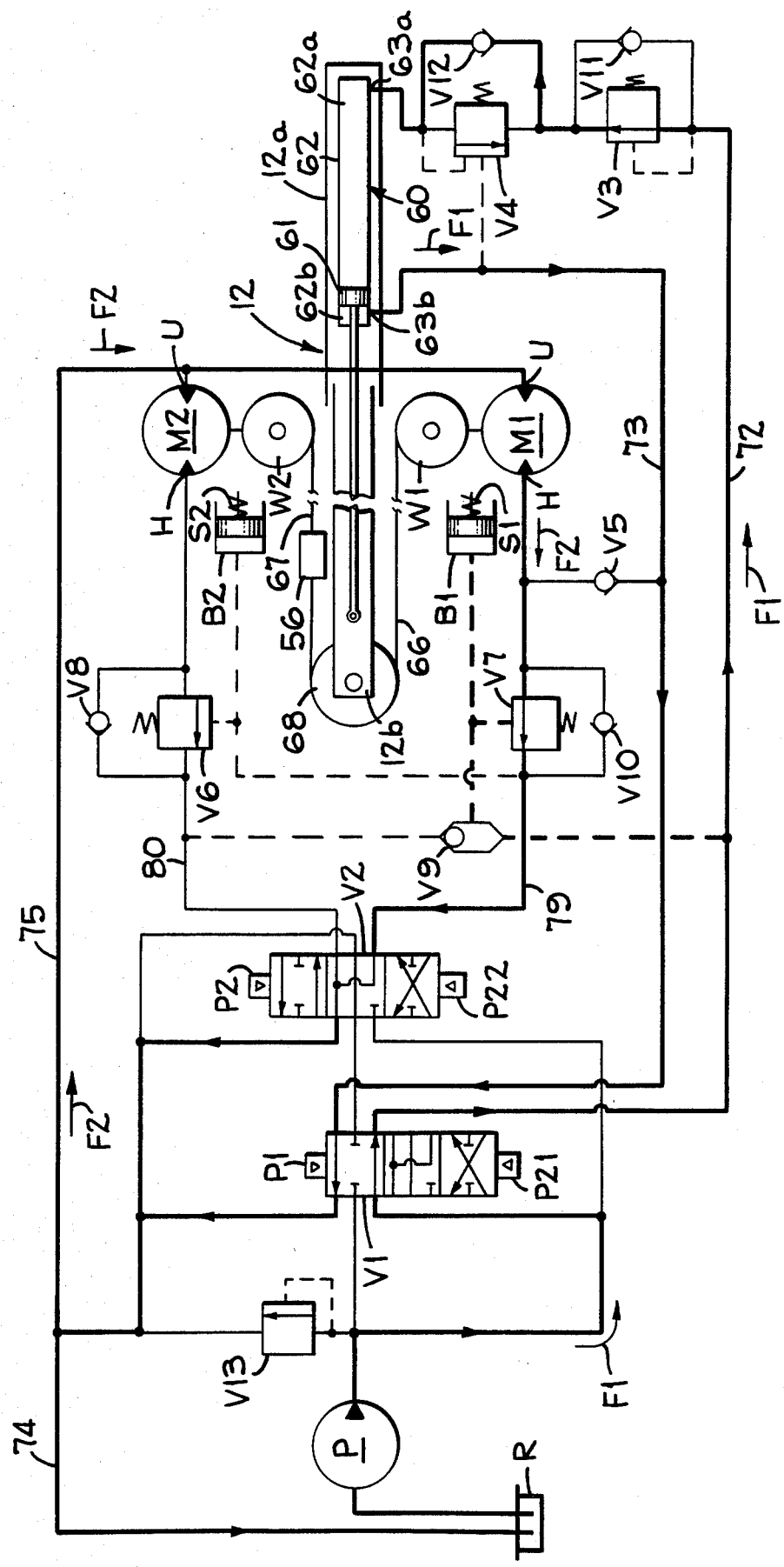
FIG_3

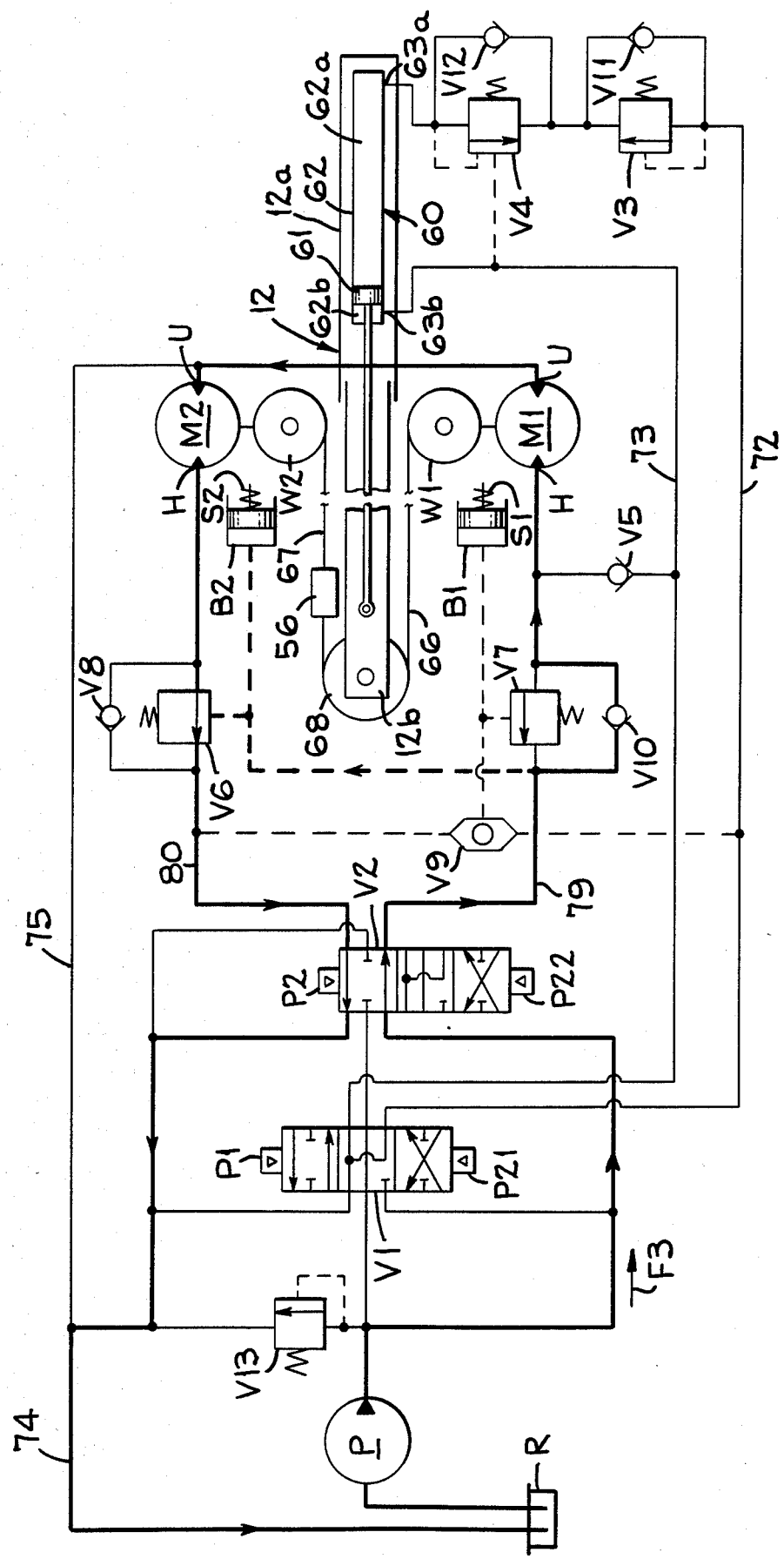
FIG_4

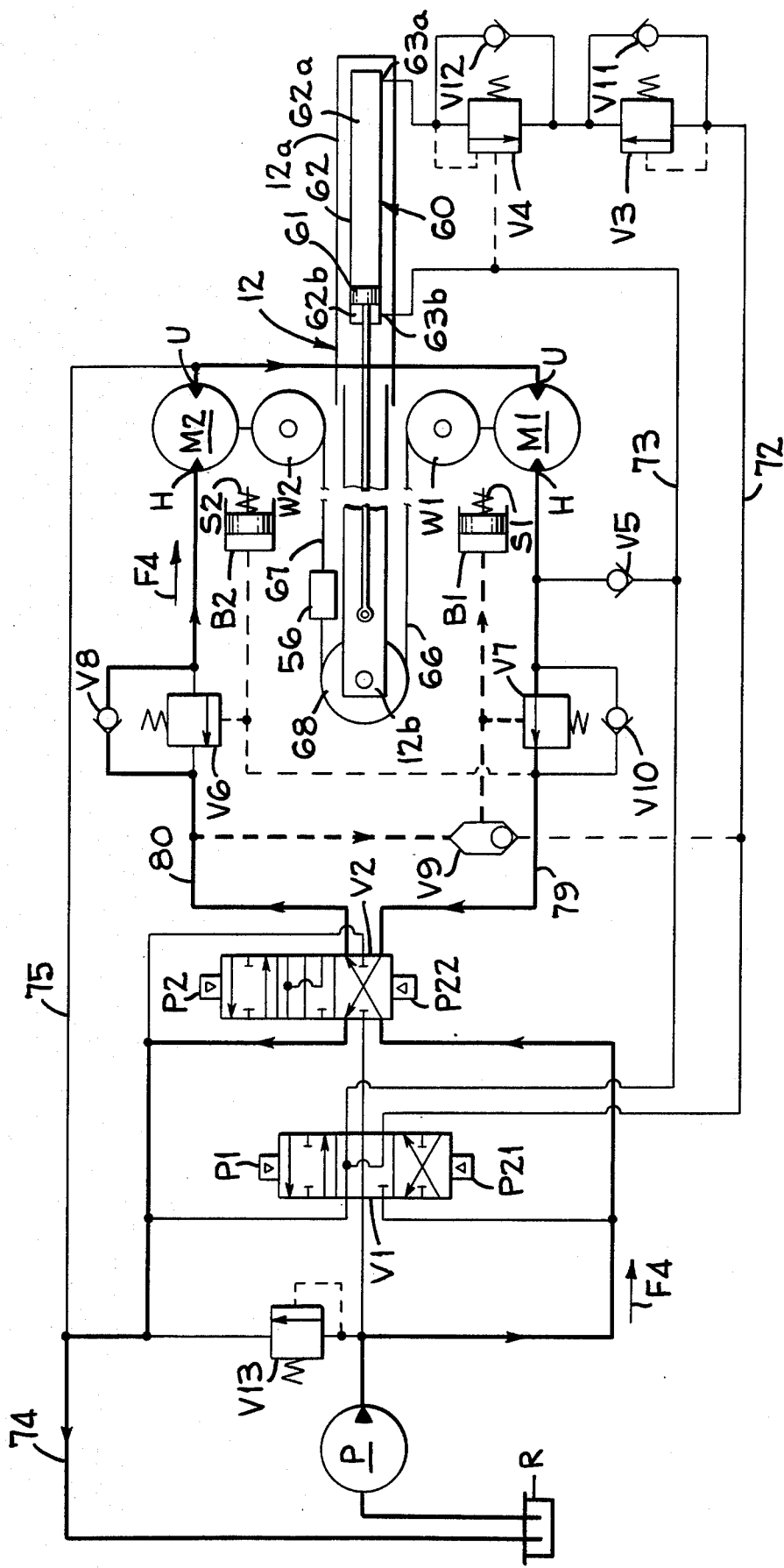
FIG_5

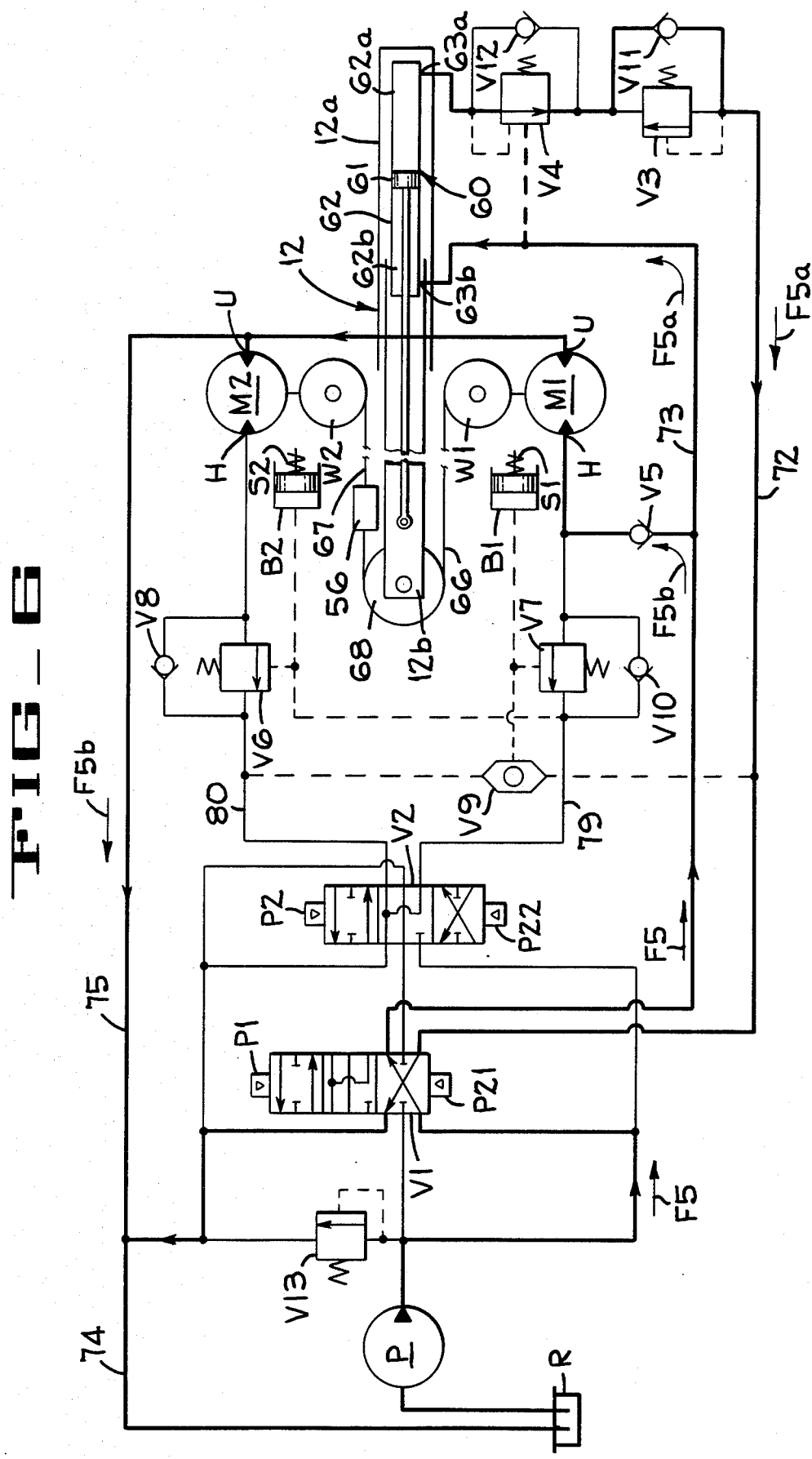
FIG_6

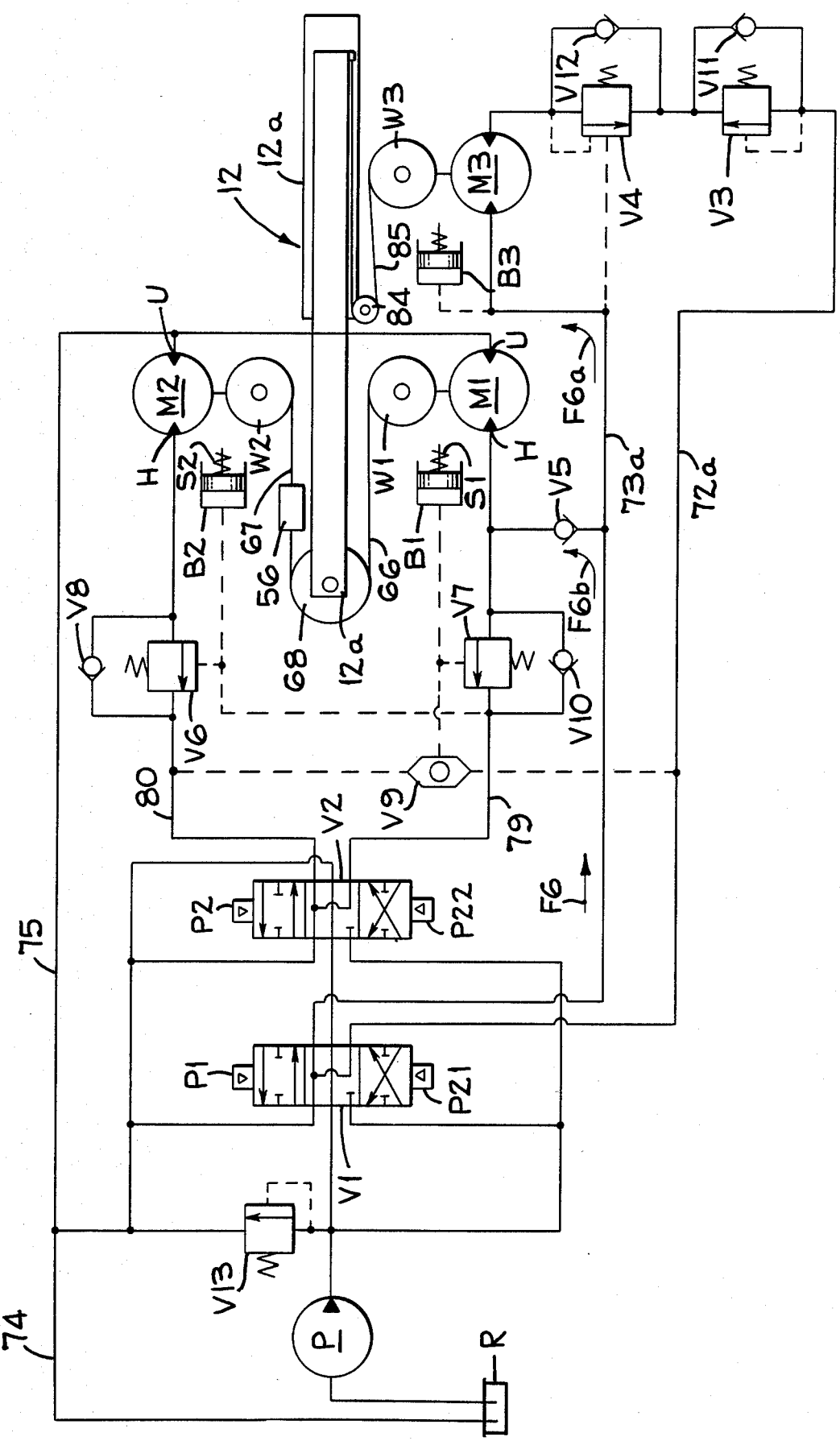
FIG_7

4,510,971

CIRCUITRY FOR OPERATING AN EXTENDIBLE BOOM AND A SERVICE LINE

BACKGROUND OF THE INVENTION

The present invention relates to a hydraulic circuit, and more particularly, to a circuit for extending and retracting a telescoping service line and for independently operating an extendible support boom. During the course of producing fluids from a petroleum well it is often desirable or necessary to subject the well to a treatment procedure in order to stimulate its fluid production. This procedure usually involves the injection of fluids under high pressure, such as 20,000 psi, to fracture the producing earth formations, or the injection of an acid solution to dissolve or otherwise remove flow of obstructing material, thereby increasing the flow of petroleum from the formation into the well. In order to carry out these well stimulating procedures, it is commonplace to employ an articulated pipe assembly, called a service line, to conduct the fluid from a pump system to the wellhead. Such a service line usually comprises a plurality of straight lengths of rigid pipe interconnected end-to-end by pipe swivel joints so the service line can be extended and retracted for use in treatment of the well.

It is known to employ the articulated well service pipe line mounted on a mobile telescoping boom assembly. This articulated pipe line may include a relatively large number of fairly short sections of pipe interconnected by a plurality of pipe elbows and swivel joints that extend from and retract into their rest or stowed position in an accordion-like manner. The telescoping boom assembly is first extended to its desired length and then the supported articulated pipe line is moved from its folded position toward its extended position until the outer end of the pipe line reaches the wellhead.

SUMMARY OF THE INVENTION

The present invention provides a hydraulic circuit for selectively extending and retracting a mobile telescoping boom assembly from its transport base to a wellhead and for independently extending and retracting an articulated pipe service line mounted on the boom assembly. Hydraulic means are provided for extending and retracting the boom assembly and for extending and retracting the articulated service line. The circuit includes a pair of winches each having a brake to lock the winches against rotation in a first direction unless a releasing pressure is applied to the brakes. A first cable is connected between an outer end of the service line and a first winch for extending the service line after the boom assembly has been extended. A second cable is connected between the outer end of the service line and a second winch for retracting the service line. The circuit includes means for releasing the first brake to allow the first winch to unwind a portion of the first cable at the same time the boom is being extended. A hydraulic ram can be used to extend and retract the boom assembly or a winch and cable arrangement can be used for extending and retracting the boom assembly.

BRIEF DESCRIPTION OF THE DRAWINGS

FIG. 1 is a side elevation of a boom supported service line which can be extended and retracted by the hydraulic circuit of the present invention.

FIG. 2 discloses details of the hydraulic circuit of the present invention used to extend and retract the service line and to independently extend and retract the boom assembly.

FIG. 3 discloses the details of operation of the present invention as the boom is being moved from a retracted position to an extended position.

FIG. 4 discloses the operation of the hydraulic circuit of the present invention as the articulated service line is being moved from a retracted position to an extended position.

FIG. 5 discloses the operation of the hydraulic circuit of the present invention as the articulated service line is moved from an extended position to a retracted position.

FIG. 6 discloses the operation of the hydraulic circuit of the present invention as the boom is being moved from an extended position to a retracted position.

FIG. 7 discloses another embodiment of the hydraulic circuit of the present invention.

DESCRIPTION OF THE PREFERRED EMBODIMENT

A telescoping boom supported clustered service line 10 (FIG. 1) which can be used with the present invention includes an articulated service line assembly 11 mounted on a telescoping boom assembly 12. The service line 11 includes a plurality of relatively long clustered pipe sections 16–18 interconnected by a plurality of pipe elbows 22 and swivel joints 23. An inner end of the pipe 18 is connected to a supply pipe 24 by a pair of swivel joints 28, a short piece of pipe 29 and pipe elbows 30. The outer end of the pipe sections 16 can be connected to a wellhead (not shown) by an outboard pipe 34, interconnected to pipe section 16 by a swivel joint 35 and a pair of pipe elbows 36.

The telescoping boom 12 (FIG. 1) comprises two boom sections 12a and 12b. The inner section 12a which is not extendible, is pivotally mounted on a turret 40 for rotation in a vertical plane about a horizontal axis A by an elevating cylinder 41. The turret 40 is mounted on a cylindrical base 42 for rotation about a vertical axis B, and the entire apparatus is suitably mounted on a trailer frame 46 or other suitable mobile transport vehicle for moving the apparatus to job sites. A plurality of extendible outriggers 47 provides stability for the trailer frame 46 when the boom assembly 12 and the service line 10 are extended for operation.

An adjustable jack stand 48 (FIG. 1) can be positioned at the tip of the boom assembly 12 to provide additional support to relieve the boom of cantilever loading during the fluid transfer operation. The jack can be pivotally connected, in a removable manner or otherwise as desired, to the tip of the boom assembly on the outer end of the boom section 12b. Thus, the jack stand can be a separate portable apparatus or can be carried by the boom to lessen the manual effort required to install and remove it. A pair of manually operated landing gears 49 provides support for the forward portion of the trailer 46 so a truck cab 50 can be disconnected from the trailer.

The pipe section 16 (FIG. 1) is connected to the boom assembly 12 by a corresponding bracket 54 and by a service line trolley 55 for movement along the length of the boom assembly. A second trolley 56 supports the outer end portion of the outboard pipe 34. Each of the trolleys 55, 56 includes a pair of rollers 57 mounted for rotational movement along the length of the boom assembly 12. A hydraulic ram 60 (FIGS. 1, 2) having a piston 61 movable inside a cylinder 62 provides means for moving the boom section 12b from the retracted position shown in FIG. 2 to the extended position shown in FIG. 3 and to return it to the retracted position when desired. Applying pressurized hydraulic fluid to the cylinder 62 through an inlet port 63a forces the piston 61 to move toward the left (FIG. 2) and applying pressurized fluid to the cylinder 62 through an inlet port 63b forces the piston 61 to move toward the right end of the cylinder. A pair of winches W1, W2, their associated drive motors M1, M2 and a pair of cables 66, 67 provides means for moving the service line assembly 11 from the retracted position shown in FIGS. 1 and 2 to the extended position shown in FIG. 3 and to return it to the retracted position when desired. The cable 66 (FIGS. 1-6) extends from the winch W1 through the boom assembly 12, over a sheave 68 to the trolley 56. When the boom assembly 12 is in extended position and the winch W1 is energized, the cable 66 pulls the trolley 56 at the outer end of the pipe 34 into the extended position. When the winch W2 is energized the cable 67 pulls the trolley 57 and the attached service line assembly 11 into the retracted position shown in FIG. 1.

Operation of the telescoping boom supported service line according to the present invention can be effected as follows. After transportation to the job site, the vehicle mounted apparatus is positioned at a safe convenient location with respect to the wellhead, and the outriggers 47 extended into functional position. The telescoping boom assembly is aligned with the wellhead, as by rotating the turret 40 and/or elevating or lowering the boom by means of the cylinder 41, and the boom section 12b is extended into a desired position near the wellhead. At this time the jack stand 48 is positioned and set and the winch W1 is energized to pull the service line assembly 12 into position for connecting the outer end of the pipe 34 to the wellhead.

The winches W1, W2 and the motors M1, M2 shown in FIGS. 2-6 are essentially standard commercial units which function as follows. To hoist or take up cable, pressure is applied to the hoist port H of the corresponding motor M1, M2, causing the motor to rotate the corresponding winch in a take-up direction. Each of the associated pressure release winch brakes Bl, B2 has an overrunning clutch so that the associated brake does not have to be released before the winch can rotate in the direction to take up the associated cable.

To cause the winch W1, W2 to unwind or free wheel, pressure must be applied to the corresponding brake Bl, B2 to release the brake which is otherwise secured in a locked position by its corresponding spring Sl, S2. Pressure must also be applied to a corresponding brake valve V7, V6 to open one of these valves and allow fluid to flow from the unwind port U through the corresponding motor M1, M2. Tension applied to the cable on one of the winches W1, W2 can also cause the winch to unwind cable 66, 67 stored thereon.

The sequence of operation of the hydraulic circuit is diagrammatically shown in FIGS. 2-6. When it is desired to move the boom assembly 12 and the service line assembly 11 from retracted positions of FIG. 1 to an extended position, the boom assembly is rotated so it extends toward the rear or to one side (FIG. 1) of the trailer frame 46. The pilot P1 (FIG. 3) of a control valve V1 is pressurized to depress the pilot P1 and move the control valve V1 from a neutral position shown in FIG. 2 to the "extend boom" position shown in FIG. 3. The pilot P1 can be pressurized by a hydraulic pressure circuit (not shown) connected to the pilot and operated by a remote control in a conventional manner. A pressurized fluid F1 flows from the pump P through the control valve V1 into the hydraulic line 72, through the back pressure valve V3 and the check valve V12 to the right end 62a of the hydraulic cylinder 62 thereby causing the piston 61 to move toward the left to the position shown in FIG. 3. The fluid F1 also flows from the left end 62b of the cylinder 62, through the line 73, through the control valve V1 and the line 74 to the reservoir R. The retract winch W2 remains locked, thus preventing the cable 67 from unwinding from the winch and preventing the trolley 56 and the service line from being extended. The back pressure valve V3 causes the pressure in line 72 to be relatively high so that this pressure is coupled through the shuttle valve V9 to the brake Bl and to valve V7 causing the brake Bl to be released and the valve V7 to be opened so that winch W1 can rotate. As the boom section 12b is extended cable 66 is unwound from the winch W1 causing the winch and the associated motor M1 to rotate. The rotating motor M1 acts as a pump causing a fluid F2 to move from the hoist terminal H through the valve V7, through the valve V2 along a line 75 back to the unwind terminal U of the motor M1.

After the boom has been extended, the service line assembly 11 (FIG. 1) can be extended by allowing the control valve V1 (FIG. 2) to return to the center position and by pressurizing the pilot P2 to move the control valve V2 into the position shown in FIG. 4. A fluid F3 (FIG. 4) flows from the pump P through the valve V2, through line 79, through the check valve V10 and the motor M1, through the motor M2 and through the valves V6 and V2 to the reservoir R. The pressure in line 79 actuates the brake B2 thereby releasing the winch W2 so that it is free to rotate and also actuates the brake valve V6 to allow fluid to flow through the motor M2. The motor M1 causes the winch W1 to reel in the cable 66 thereby moving the trolley 56 and the outer end of the service line to the outer end of the boom section 12b. As cable 66 is reeled in, cable 67 is pulled off the winch W2 causing winch W2 and motor M2 to rotate. The rotating motor M2 acts as a pump causing fluid to flow through motor M2, valve V6 and valve V2.

The service line assembly 11 (FIG. 1) can be retracted by pressurizing the pilot P22 to move the control valve V2 into the position shown in FIG. 5. Hydraulic fluid F4 flows from the pump P, through the control valve V2 and line 80, through the check valve V8, through motors M2, M1 and through valves V7 and V2 to the reservoir R. The pressure on line 80 is coupled through the shuttle valve V9 to the brake Bl thereby releasing the brake on the winch W1 and allowing this winch to free wheel. Pressure in line 80 also opens the brake valve V7 to complete the fluid path through motor M1. The fluid F4 actuates the motor M2 causing the motor to rotate the winch in the take up direction to reel the cable 67 onto the winch W2 and to move the trolley 56 and the service line assembly 11 into the retracted position shown in FIG. 1. As cable 67 is reeled in, cable 66 is pulled off the winch W1 causing winch W1 and motor M1 to rotate. The rotating motor M1 acts as a pump causing fluid to flow through motor M1, valve V7 and valve V2.

The outboard boom section 12b can be retracted by pressurizing the pilot P21 to move the control valve V1 into the position shown in FIG. 6. A pressurized fluid F5 flows from the pump P through the control valve V1 into the fluid line 73. A portion of this fluid F5a provides a pressure which opens valve V4. The fluid F5a flows into the left chamber 62b of the cylinder 62 forcing the piston 61 to the right and forcing fluid out of the chamber 62a through the valves V4, V11 and V1 back to the reservoir R thereby retracting the boom 12. A fluid F5b passes through the valve V5 and the motor M1, causing the motor M1 to rotate the winch W1 to wind the cable 66 onto the winch. The brake B2 locks the winch W2 so that the cable 67 cannot unwind from the winch W2 and the cable 66 being wound onto the winch W1 applies a force to the sheave 68 which aids in retracting the outer boom section 12b back into the inboard boom section 12a.

A pressure relief valve V13 protects the pump P from excessive pressures by allowing fluid to flow from the pump P to the reservoir R when the pump pressure rises above a predetermined value. The pressure valve V3 keeps the pressure on line 72 at a value high enough to operate the valve V7 and the brake B1 while the boom assembly is being extended. The valve V4 regulates the pressure inside the chamber 62a of the cylinder 62 and prevents overrunning during the retraction of the boom assembly.

Another embodiment of the present invention shown in FIG. 7 differs from the first embodiment by having a motor M3, a winch W3, a sheave 84 and a cable 85 for extending the boom assembly. When the pilot P1 (FIG. 7) is pressurized a pressurized fluid flows from the pump P through the valve V1, the line 72a, valves V3, V12, the motor M3, and valve V1 to the reservoir R. The pressurized fluid in line 72a opens the valve V3, and the energized motor M3 causes the winch W3 to take up the cable 85 thereby pulling the outboard boom section 12b to the left and extending the boom assembly. Pressure in line 72a releases the brake B1 and opens the valve V7, allowing winch W1 to unwind cable 66 while the boom assembly is being extended. The service line assembly 11 is extended and retracted in the same manner described above in connection with the first embodiment of the present invention.

The boom assembly 12 (FIG. 7) is retracted by locking the winch W2 after the service line has been retracted and then energizing the motor M1 to rotate the winch W1 and to take up the cable 66 on winch W1 and pull the boom section 12b toward the right to the position shown in FIG. 7. Boom retraction is accomplished by pressurizing pilot P21 to move valve V1 into the position shown in FIG. 6 which connects hydraulic line 73a (FIG. 7) to the pump P. A pressurized fluid F6 flows from the pump P, through the valve V1 into the line 73a, where the fluid flow splits into flow F6a and F6b. Fluid F6b flows through valve V5, motor M1, and line 75 to reservoir R. Fluid flow F6b causes the motor M1 to rotate the winch W1 and take up the cable 66 in the manner described above in connection with FIG. 6 wherein the winch W1 assisted in retracting the boom assembly. However, in the embodiment of FIG. 7, winch W1 provides all of the force to retract the boom section 12b into the boom section 12a. The pressure in line 73a releases the brake B3 and opens the valve V4 (FIG. 7), permitting winch W3 to free wheel and allowing the cable 85 to unwind as needed, as the boom section 12b is retracted. Fluid flow F6a passes through motor M3, valves V4, V11, V1 and returns to the reservoir R. Valve V4 provides sufficient pressure on line 73a to insure that fluid flow F6b operates motor M1 and retracts the boom assembly.

The present invention uses control valves to control pressurized fluid which extends and retracts a telescoping boom assembly and independently controls the extension and retraction of an articulated service line mounted on the boom assembly.

Although the best mode contemplated for carrying out the present invention has been herein shown and described, it will be apparent that modification and variation may be made without departing from what is regarded to be the subject matter of the invention.

What is claimed is:

1. A hydraulic circuit for extending and retracting a telescoping service line and for independently extending and retracting a telescoping boom for supporting said service line, said circuit comprising:

a hydraulic ram having first and second input ports, said hydraulic ram being connected to said boom for extending and retracting said boom;

first and second winches each having braking means to lock said winches against rotational movement in a first direction unless a releasing pressure is applied to said means;

first cable means connected between said first winch and an outer end of said service line for extending said service line;

second cable means connected between said second winch and said outer end of said service line for retracting said service line;

means for releasing a first braking means to allow said first winch to rotate in a first direction and to unwind a portion of said first cable means when said boom is being extended; and means for applying a pressurized fluid to energize said first winch causing said first winch to apply to take up force to said first cable and for simultaneously applying said pressurized fluid to said second braking means to allow said second winch to unwind said second cable and to extend said service line when said boom is in an extended position.

2. A hydraulic circuit as defined in claim 1 including means for actuating said first winch to take up said first cable when said boom is being retracted.

3. A hydraulic circuit as defined in claim 1 including means for actuating said first winch to aid said hydraulic ram in retracting said boom.

4. A hydraulic circuit as defined in claim 1 including means for applying a pressurized fluid to said first ram input port for extending said boom and for simultaneously applying said pressurized fluid to said first braking means to allow said first winch to unwind said first cable as said boom is extended.

5. A hydraulic circuit as defined in claim 1 including means for applying a pressurized fluid to said second ram input port for retracting said boom and for simultaneously applying said pressurized fluid to energize said first winch causing said first winch to apply a take up force to said first cable and to assist in retracting said boom.

6. A hydraulic circuit for use with a source of pressurized fluid, to extend and retract a telescoping service line and to independently extend and retract a telescoping boom for supporting said service line, said circuit comprising:

a hydraulic ram having first and second input ports, said hydraulic ram being connected to said boom for extending and retracting said boom;

first and second winches;
first and second cable means;
means for connecting said first cable means between said first winch and an outer end of said service line to extend said service line when said first winch is actuated;
means for connecting said second cable means between said second winch and said outer end of said service line to retract said service line when said second winch is actuated;
first and second braking means each coupled to a corresponding one of said winches to lock said winches from rotating in an unwind direction unless a releasing pressure is applied to said braking means;
means for allowing said winches to rotate in a cable take up direction in the absence of a releasing pressure to said braking means; and
means for applying said pressure source to said first input port of said ram to extend said boom and for simultaneously applying said pressure source to said first braking means to allow a portion of said first cable to unwind from said first winch as said boom is extended.

7. A hydraulic circuit as defined in claim 6 including a sheave rotatably mounted at an outer end of said boom and means for training said first cable about said sheave to route said first cable between said first winch and said outer end of said service line.

8. A hydraulic circuit for use with a source of pressurized fluid, to extend and retract a telescoping service line and to independently extend and retract a telescoping boom for supporting said service line, said boom having a nonextendible inner section and at least one extendible section, said circuit comprising:
first, second and third winches each having braking means to lock said winches against rotational movement in a first direction unless a releasing pressure is applied to said braking means;
first, second and third cable means;
means for connecting said third cable means between said third winch and an inboard portion of said extendible section to extend said boom when said third winch is energized;
means for connecting said first cable means between said first winch and an outer end of said service line for extending said service line;
means for connecting said second cable means between said second winch and said outer end of said service line for retracting said service line; and
means for releasing said first braking means to allow said first winch to rotate in a first direction and to unwind a portion of said cable means when said boom is being extended.

9. A hydraulic circuit as defined in claim 8 including means for training said first cable about an outboard end of said extendible section, and means for rotating said first winch in a second direction to take up said first cable and to pull said extendible boom section into a retracted position when said second winch is in a rewound and locked position.

10. A hydraulic circuit as defined in claim 8 including means for applying a pressurized fluid to energize said third winch for extending said boom and for simultaneously applying said pressurized fluid to said first braking means to allow said first winch to unwind said first cable as said boom is extended.

11. A hydraulic circuit as defined in claim 8 including means for applying a pressurized fluid to energize said first winch causing said first winch to apply a take up force to said first cable and for simultaneously applying said pressurized fluid to said second braking means to allow said second winch to unwind said second cable and to extend said service line when said boom is in an extended position.

12. A hydraulic circuit as defined in claim 8 including means for applying a pressurized fluid to energize said second winch to apply a take up force to said second cable and for simultaneously applying said pressurized fluid to said first braking means to allow said first winch to unwind said first cable and to retract said service line.

13. A hydraulic circuit as defined in claim 9 including means for applying a pressurized fluid to release said third braking means when said first winch rotates in said second direction to retract said boom assembly.

* * * * *